United States Patent [19]
Maronde et al.

[11] 3,816,841
[45] June 11, 1974

[54] DEVICE FOR THE AUTOMATIC STOP SETTING OF PHOTOGRAPHIC CAMERAS

[75] Inventors: Herbert Maronde, Dusseldorf; Hans Dietrich Schmidt, Monheim-Baumberg, both of Germany

[73] Assignee: Robot Foto und Electronic GmbH & Co. KG., Dusseldorf-Benrath, Germany

[22] Filed: Oct. 6, 1972

[21] Appl. No.: 295,729

[30] Foreign Application Priority Data
Oct. 13, 1971 Germany.......................... 2150945

[52] U.S. Cl. ............. 95/10 CD, 95/64 R, 250/215, 250/229, 352/141
[51] Int. Cl. ........................ G03b 7/08, G03b 9/02
[58] Field of Search .... 95/10 C, 10 CD, 11.5, 64 R; 352/141; 250/215, 229

[56] References Cited
UNITED STATES PATENTS

| | | | |
|---|---|---|---|
| 2,655,086 | 10/1953 | Walker | 95/64 R |
| 3,250,193 | 5/1966 | Horton | 95/10 C |
| 3,340,785 | 9/1967 | Adler et al. | 95/10 CD |
| 3,430,053 | 2/1969 | Westhaven | 95/10 CD X |
| 3,455,227 | 7/1969 | Sato et al. | 95/10 CD X |
| 3,526,453 | 9/1970 | Ruhle | 95/64 R X |

FOREIGN PATENTS OR APPLICATIONS

| | | | |
|---|---|---|---|
| 730,288 | 3/1935 | Germany | |
| 1,283,096 | 12/1961 | France | 95/10 CD |

*Primary Examiner*—Joseph F. Peters, Jr.
*Attorney, Agent, or Firm*—Darbo, Robertson & Vandenburgh

[57] ABSTRACT

An attachment for a camera has an adjusting ring rotatable about an axis. The stop setting ring of the camera is positioned within the adjusting ring and the two are engaged so that rotation of the adjusting ring will rotate the stop setting ring. A photoelectric cell projecting forwardly on the attachment measures the ambient light and operates a servomotor to rotate the adjusting ring accordingly. A shade affixed to the adjusting ring moves into the path of the light to the photocell to a greater or less extent depending on the position of the adjusting ring. This is correlated with the light through the lens setting so that when the latter is at an optimum, the amount of light reaching the cell (past the shade) causes the cell to deenergize the servomotor.

16 Claims, 4 Drawing Figures

3,816,841

DEVICE FOR THE AUTOMATIC STOP SETTING OF PHOTOGRAPHIC CAMERAS

BACKGROUND AND SUMMARY OF THE INVENTION

This invention relates to a device for the automatic stop setting of photographic cameras.

It is an object of this invention to provide a device for the automatic stop setting of photographic cameras which have no built-in automatic stop control, in particular, for photographic cameras with interchangeable lenses.

The device, according to the invention, is characterized by an attachment, separate from the camera, but mountable on the camera. It includes an adjusting ring which is coupled mechanically to the stop setting ring of the camera lens. There is a servomotor in driving connection with the adjusting ring and a photoelectric detector disposed on the object side to control the servomotor.

Advantageously, the attachment is designed box-shaped having a central aperture into which the camera lens extends and which is surrounded by the adjusting ring. A crescent-shaped stop may be mounted to the adjusting ring. This stop moves in front of the photoelectric detector so that the detector is more or less masked in dependence on the position of the adjusting ring. This stop effects an automatic balancing so that the adjusting ring adjusts to a particular position in response to the brightness effective at the detector.

To couple the adjusting ring with the stop setting ring of the camera lens a coupling ring is mounted in a predetermined position on the stop setting ring. This coupling ring has an axially aligned groove on its periphery. A pawl is mounted on the setting ring and has an inclined nose. When the stop setting ring of the camera is moved into the adjusting ring, this nose rides up on the periphery of the coupling ring. Thereafter, upon rotation of the adjusting ring, the pawl drops into the axial groove of the coupling ring. This type of coupling permits coupling of the setting ring in the correct position with different camera lenses (interchangeable lenses).

Signal elements, for instance, indicator lamps, are actuated to indicate when the adjusting ring reaches the one or the other end rotational position.

To control the servomotor the amplified signal from the photoelectric detector energizes a pair of series-connected complementary transistors. These transistors have interconnected collectors connected with the bases of a pair of complementary power transistors. The power transistors are connected to the armature of the servomotor in a manner such that they can send current through the armature in one direction or the other. The amplified detector signal is applied to the slider of a potentiometer which is connected between the bases of the said complementary transistors. By adjusting the slider position, the state of balancing of the series connected transistors can be adjusted. The brightness of the light reaching the detector is varied by the position of a shade or stop on the adjusting ring. When the adjusting ring is in the proper position, the amount of light causes the servomotor to stop. The photoelectric detector may be a photoconductive cell and is part of a voltage divider circuit, which includes a resistor changeable in steps by means of a setting knob. This latter resistor provides adjustment for film sensitivity and exposure time.

Parallel limit switches are used in the electric circuit of the servomotor armature. These switches open when the adjusting ring assumes an end position. They are in series-connection with a respective one of two diodes connected back to back. Thereby, when the servomotor is running with one polarity and reaches the end position, the motor is deenergized by the one limit switch, and the passage of current via the other limit switch at this polarity is blocked by the diode in series-connection with that other limit switch. However, current of the opposite polarity can still be applied to the motor through the latter circuit.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disquise it by variations in form or additions or further improvements.

Figure 4:
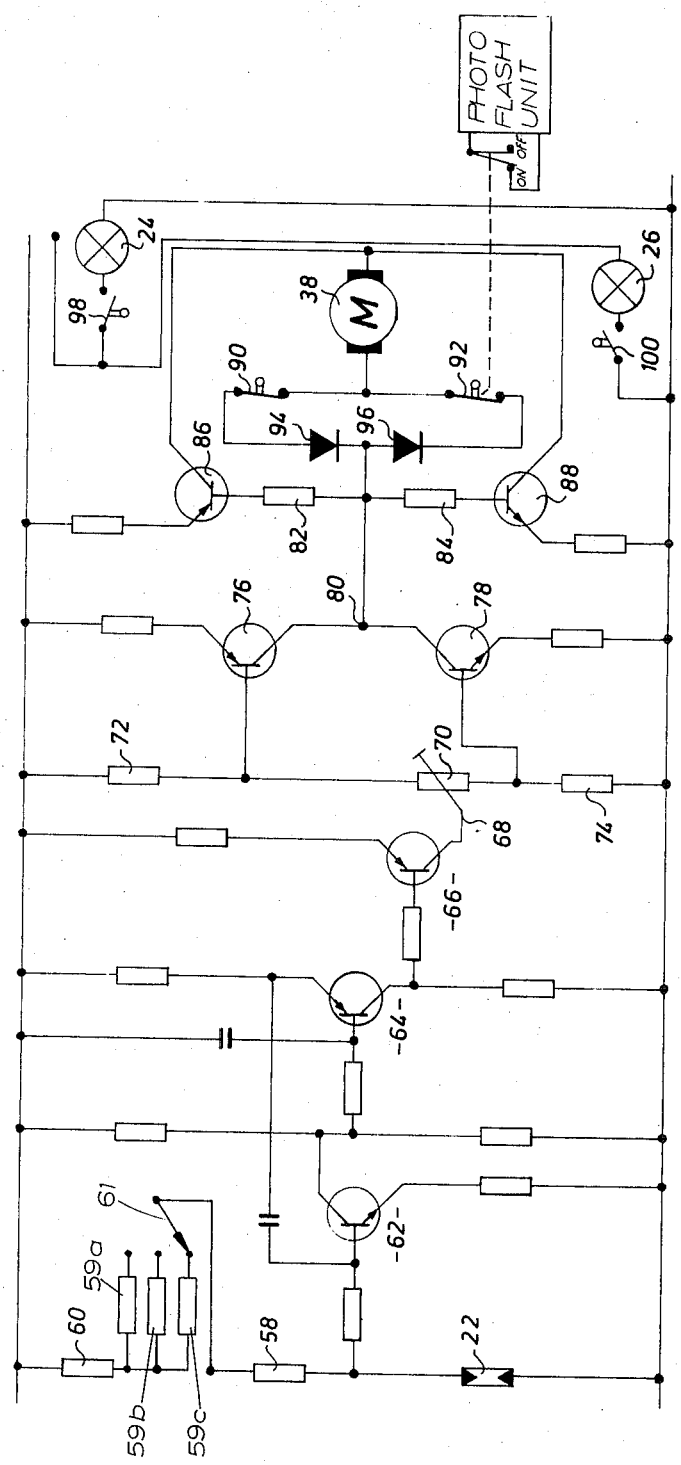
FIG. 4 is a circuit diagram of the servomotor control.

The illustrated embodiment forms an attachment having a box-type body 10 having a central aperture 12. The objective lens 14 of the camera 16 extends into the aperture 12. The attachment and camera are mounted on a common support 18 known per se. On the front plate of the attachment on the object side there is an opening 20 behind which is a photoelectric detector 22 (FIG. 4).

Figure 1:
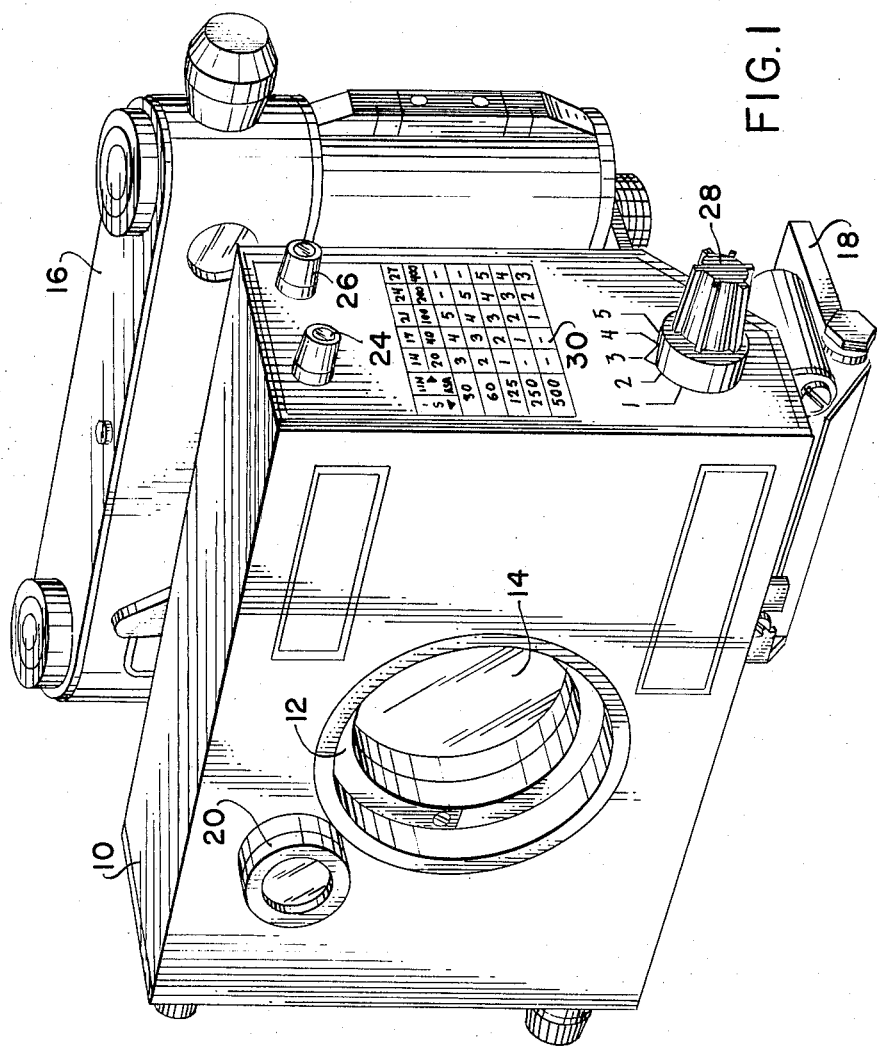
FIG. 1 is a perspective illustration of a camera with an attachment embodying the invention.

At the top of one side of the attachment 10 (the right in FIG. 1) are two indicator lamps 24 and 26. These light up respectively when the setting ring has moved into the one or the other of the end positions and further stop adjustment is not possible. At the bottom of the same side is a setting knob 28. It may be set into different positions "1 to 5" for adaption to different film sensitivities and exposure times. Above the setting knob 28 is a table 30 indicating which position must be selected for different exposure times and different film sensitivities.

Figure 2:
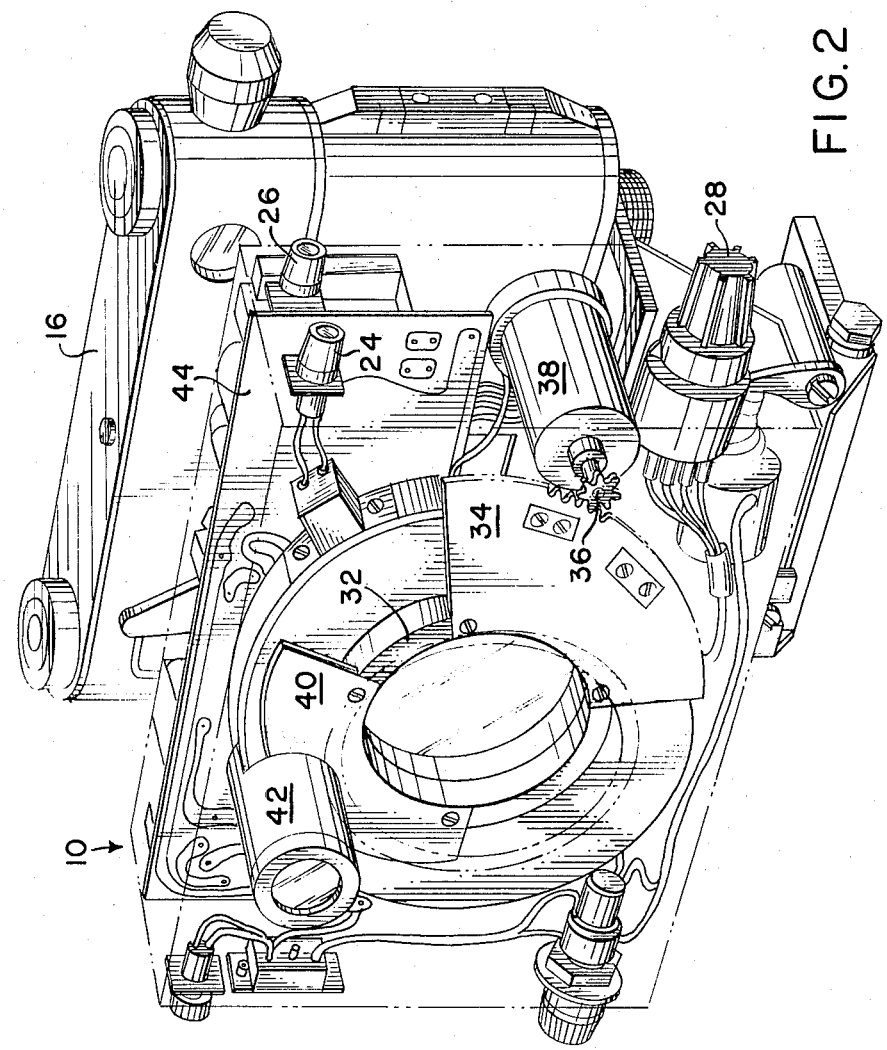
FIG. 2 is a corresponding perspective view with the housing of the attachment being removed.

As can best be seen from FIG. 2, there is an adjusting ring 32 within the housing and about the aperture 12. A gear segment 34 is attached to the adjusting ring and meshes with a pinion 36 on the shaft of a servomotor 38. Also mounted on the adjusting ring 32 is a crescent-shaped light stop or shade 40. Stop 40 projects into a tube 42 which extends from the front opening 20 to the photoelectric detector. Thereby, the light impinging upon the photoelectric detector is blocked out to a greater or less extent depending on the position of the adjusting ring 32. The electric circuit of the device is on a circuit board 44.

Figure 3:
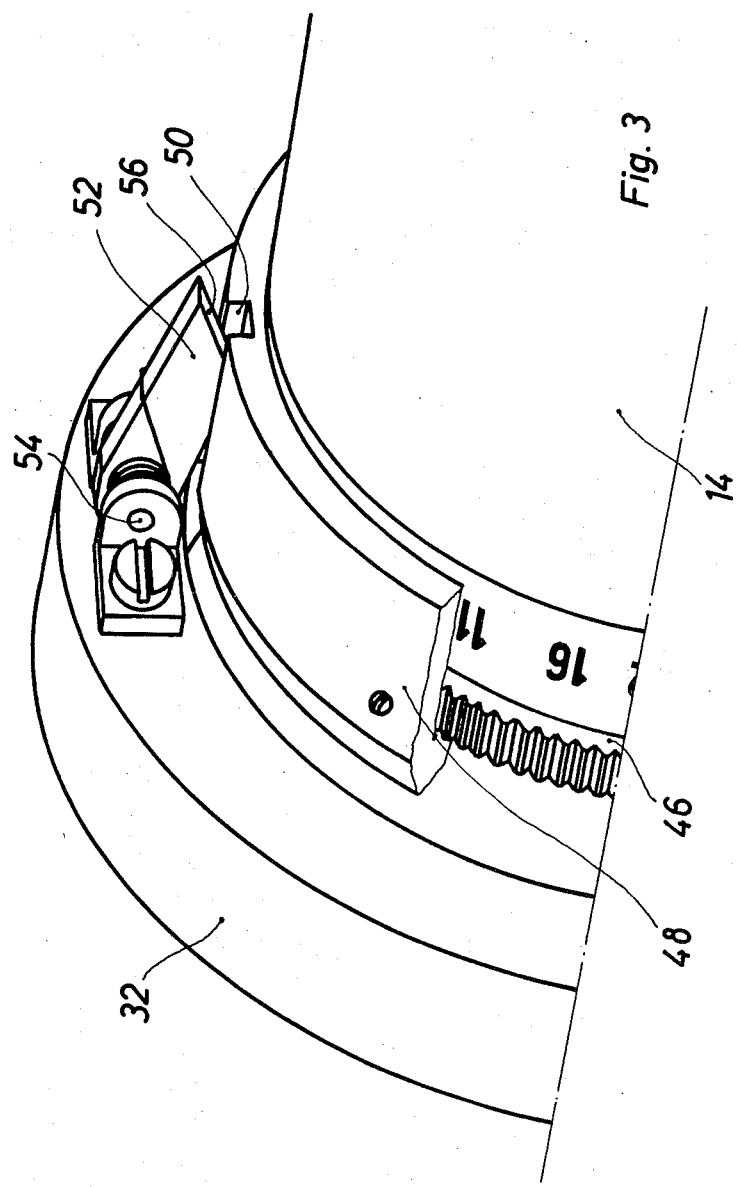
FIG. 3 is a fragmentary perspective view of the coupling between adjusting ring and setting ring of the camera lens.

FIG. 3 illustrates the manner in which the adjusting ring 32 is coupled with the stop setting ring 46 of the camera lens 14. To this end, a coupling ring 48 is secured (as by means of screws) in a suitable position on the stop setting ring of the camera lens. The coupling ring has an axial groove 50 on its circumferential surface. A pawl 52 is pivotally mounted on the setting ring 32 by a pin 54. The pawl 52 has an inclined nose 56. When the camera lens is moved into the aperture 12, the pawl 52 will generally not be in alignment with the groove 50. The pawl 52 is then raised by the inclined nose 56 so that it rests on the circumferential surface of the coupling ring 48. Now, however, if the adjusting ring 32 is rotated, that rotation of the pawl 52 will result in its dropping into slot 50 when the two come into alignment. Such rotation may be achieved by masking the photoelectric detector 22 so that the servomotor moves the adjusting ring into an end position. When the pawl 52 engages in the groove 50, the adjusting ring and the stop setting ring of the camera lens are coupled in the appropriate position with respect to each other.

FIG. 4 illustrates the control means for the servomotor. The photoelectric detector 22 is a photoconductive cell which, in series with resistors 58 and 60 and one of a plurality of resistors 59a, 59b, 59c, etc., is across a d.c. voltage source (not shown). A switch 61, controlled by knob 28, determines which of the resistors 59a, 59b, 59c, etc., is in the circuit. The voltage dropping across the photoconductive cell 22 is applied via amplifier stages 62, 64, 66 to the slider 68 of the potentiometer 70. Potentiometer 70 is between two resistors 72, 74 with the three being across the d.c. supply voltage. At opposite ends of potentiometer 70 are connections to the bases of two complementary transistors 76 and 78. These transistors are series-connected to the d.c. supply voltage and have their collectors interconnected at 80. The connecting point 80 is connected by resistors 82 and 84 to the bases of two power transistors 86 and 88. The servomotor 38 is excited with the one or the other polarity and accordingly produces armature rotation in one or the other sense. In the motor circuit are two limit switches 90 and 92. Each of these is in series with a respective one of two antiparallelly connected diodes, 94 and 96 respectively, with the switch and diode combinations being in parallel between point 80 and the motor 38. Limit switch 90 is mechanically coupled to a switch 98 and limit switch 92 is similarly coupled to a switch 100. Thus when a limit switch is opened, the respective switch 98 or 100 is simultaneously closed to light the respective signal lamp 24 or 26.

The photoelectric detector 22 supplies a signal which after amplification by the amplifiers 62, 64 and 66 is applied to the slider 68 of the potentiometer 70. The slider 68 is adjusted so that with a specific detector signal the two transistors 76 and 78 are energized in the same degree. This establishes the potential of point 80 at a mean value at which also the power transistors 86 and 88 are energized in the same degree. Therefore the motor 38 stands still. With a change in the brightness at the detector 22 this equilibrium will be disturbed towards the one or the other side depending whether more or less light is received. Thus the motor 38 is excited with the one or the other polarity. The motor rotates the adjusting ring 32 which in turn moves the setting ring 32 and also the stop 40. Thereby, when the adjusting ring 32 arrives at the correct exposure setting, the stop 40 will have varied the amount of light impinging upon the photoelectric detector 22 to an extent such that the state of equilibrium will be obtained again and the motor will stop.

If the motor moves the setting ring 32 to one of the end positions, then the switch 90 or the switch 92 will open. Thereby, the motor is stopped since with the corresponding polarity of the excitation, flow through the other branch is blocked by the respective diode 94 or 96. For example, say that motor 38 is energized through branch 90, 94. With this polarity, diode 96 prevents the motor from being energized through branch 92, 96. Thus when limit switch 90 opens, the motor stops. Now if there is a change in the polarity of the signal applied to the motor, the current can then return through the closed switch 92 and the diode 96. The reverse would be true if the motor had originally been energized through switch 92 and it opened. When the end position is reached the respective switch 98 or 100 is closed to light lamp 24 or 26 respectively.

In the end position of the adjusting ring, which end position corresponds to dim illumination, a flash unit coupled with the camera can automatically be switched on. This would be done by an additional switch, not shown, mechanically coupled to limit switch 90 or 92.

We claim:
1. An attachment for automatically positioning the rotatable light stop setting ring on the lens of a camera, said attachment comprising:
   a rotatable adjusting ring;
   means for mechanically coupling the adjusting ring and the setting ring for movement in unison comprising
      a coupling ring segment received in a particular position on said setting ring, said segment having a curved periphery with an opening thereon, and
      a pawl mounted on the adjusting ring in a position to enter said opening on the segment and thereby engage the segment, said pawl being movable toward and away from the segment so that it can rest on said periphery when not aligned with the segment opening;
   a servomotor coupled to the adjusting ring for rotating the same; and
   control means coupled to the servomotor and including a photoelectric detector positioned on the object side of the attachment for controlling the servomotor in response to the ambient light conditions.

2. An attachment as set forth in claim 1, including a box-shaped body having a central aperture into which the camera lens extends, said adjusting ring being positioned around said aperture.

3. An attachment as set forth in claim 2, including shade means secured to the attachment ring and positioned to move in a path in front of the detector for blocking the light to the detector to a greater and less extent depending upon the position of the adjusting ring.

4. An attachment as set forth in claim 3,
   wherein said setting ring has two limits of movement, including signal means connected to said control means to identify when the limits of movement are reached.

5. An attachment as set forth in claim 3, wherein said servomotor has an armature energizable in one polarity to achieve rotation in one direction and energizable in the other polarity to achieve rotation in the other direction, said control means includes a pair of power transistors connected to said armature, and a pair of series-connected complementary transistors having interconnected collectors connected to the bases of the power transistors to control the polarity of energization of said armature.

6. An attachment as set forth in claim 5, wherein said control means includes a potentiometer having a slider, said potentiometer being connected between the bases of said complementary transistors, and means connecting said detector to said slider.

7. An attachment as set forth in claim 5,
wherein said adjusting ring has two limits of rotation, said control means including first limit switch means positioned to be actuated when one of said limits of rotation is reached, second limit switch means positioned to be actuated when the other of said limits of rotation is reached, first circuit means including the first limit switch means, second circuit means including the second limit switch means, said circuit means being connected in parallel with each other and in series with said armature, one circuit means including a diode permitting current flow only in one direction and the other circuit means including a diode permitting current flow only in the other direction.

8. An attachment as set forth in claim 7,
wherein said detector is a photoconductive cell, and said means connecting said detector to said slider includes voltage divider including resistance means variable in steps by means of a setting knob.

9. An attachment as set forth in claim 1 for use with a photoflash unit, characterized by said setting ring having a limit of movement corresponding to minimum ambient illumination, said control means including switch means connectable to said unit to switch on said unit when said limit of movement is reached.

10. An attachment as set forth in claim 1, wherein said opening is a slot aligned with the axis of the opening and said pawl is mounted for pivotal movement about a line in a plane transverse to said axis.

11. An attachment as set forth in claim 1,
wherein said setting ring has two limits of movement, including signal means connected to said control means to identify when the limits of movement are reached.

12. In an attachment for automatically setting photographic cameras having an objective and a diaphragm setting ring, said attachment including an actuating element adapted to be mechanically coupled to said diaphragm setting ring, a servomotor, means rotatably coupling said motor with said actuating element, a photoelectric detector, a tube through which said detector receives light, electronic means connecting said detector and said motor for setting the rotatable position of the motor in response to the light received by said detector, the improvement in said attachment comprising:

a box shaped body having a substantially centrally positioned aperture therethrough into which aperture said camera objective extends, said tube being adjacent said aperture and generally parallel thereto, said actuating element comprising an actuating ring encircling said aperture and means for coupling said actuating ring wigh said setting ring at a predetermined relative position, a crescent-shaped light stop affixed to said actuating ring and extending into said tube to control the amount of light passing through the tube to the detector as a function of the position of the actuating ring, said rotatable coupling means including a gear segment attached to said actuating ring and a pinion on the shaft of the servomotor in mesh with said gear segment, and said electronic means including an amplifier.

13. An attachment as set forth in claim 12,
wherein said servomotor has an armature energizable in one polarity to achieve rotation in one direction and energizable in the other polarity to achieve rotation in the other direction, said control means includes a pair of power transistors connected to said armature, and a pair of series-connected complementary transistors having interconnected collectors connected to the bases of the power transistors to control the polarity of energization of said armature.

14. An attachment as set forth in claim 13, wherein said control means includes a potentiometer having a slider, said potentiometer being connected between the bases of said complementary transistors, and means connecting said detector to said slider.

15. An attachment as set forth in claim 14,
wherein said detector is a photoconductive cell, and said means connecting said detector to said slider includes voltage divider including resistance means variable in steps by means of a setting knob.

16. An attachment as set forth in claim 12,
wherein said adjusting ring has two limits of rotation, said control means including first limit switch means positioned to be actuated when one of said limits of rotation is reached, second limit switch means positioned to be actuated when the other of said limits of rotation is reached, first circuit means including the first limit switch means, second circuit means including the second limit switch means, said circuit means being connected in parallel with each other and in series with said armature, one circuit means including a diode permitting current flow only in one direction and the other circuit means including a diode permitting current flow only in the other direction.

* * * * *